US012385326B2

(12) United States Patent
Owoeye et al.

(10) Patent No.: US 12,385,326 B2
(45) Date of Patent: Aug. 12, 2025

(54) HIGH TORQUE THREADED CONNECTIONS WITH EXTERNAL UPSET AND MULTIPLE SEALS

(71) Applicant: SAUDI ARABIAN OIL COMPANY, Dhahran (SA)

(72) Inventors: Oladele Owoeye, Dhahran (SA); Jasem Moyaibed, Tarut (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 188 days.

(21) Appl. No.: 17/818,902

(22) Filed: Aug. 10, 2022

(65) Prior Publication Data

US 2024/0052710 A1    Feb. 15, 2024

(51) Int. Cl.
*E21B 17/042* (2006.01)
*F16L 15/00* (2006.01)

(52) U.S. Cl.
CPC ........ *E21B 17/0423* (2013.01); *F16L 15/002* (2013.01)

(58) Field of Classification Search
CPC ... E21B 17/0423; F16L 15/002; F16L 15/003; F16L 15/06; F16L 15/008; F16L 15/009; F16L 15/04
See application file for complete search history.

(56) References Cited

U.S. PATENT DOCUMENTS

| | | | | |
|---|---|---|---|---|
| 2,587,544 A | * | 2/1952 | Sneddon | F16L 15/002 285/391 |
| 2,772,102 A | | 11/1956 | Webb | |
| 3,870,351 A | * | 3/1975 | Matsuki | F16L 15/00 285/334 |
| 3,994,516 A | * | 11/1976 | Fredd | E21B 17/0423 285/392 |
| 4,192,533 A | * | 3/1980 | Blose | F16L 15/008 285/334 |
| 4,384,737 A | * | 5/1983 | Reusser | F16L 15/004 285/369 |

(Continued)

FOREIGN PATENT DOCUMENTS

| CN | 111448408 A | | 7/2020 | |
|---|---|---|---|---|
| CN | 114402116 A | * | 4/2022 | ......... E21B 17/0423 |

(Continued)

*Primary Examiner* — Matthew Troutman
*Assistant Examiner* — Alexander T Rufrano
(74) *Attorney, Agent, or Firm* — Vorys, Sater, Seymour and Pease LLP (57) ABSTRACT

A threaded connection includes a first tubular member having a box end defining an internal thread profile, and a second tubular member having a pin end defining an external thread profile threadably engageable with the internal thread profile of the box end. The external thread profile includes a first section that extends at a first taper angle relative to a longitudinal axis of the threaded connection, a second section extending from the first section at a second taper angle relative to the longitudinal axis, and an intermediate shoulder provided at a transition between the first and second sections and engageable with a corresponding intermediate shoulder provided on the internal thread profile. A cross-sectional area of the pin end increases at the intermediate shoulder.

19 Claims, 3 Drawing Sheets

(56) References Cited

U.S. PATENT DOCUMENTS

| | | | | |
|---|---|---|---|---|
| 4,426,105 A * | 1/1984 | Plaquin | .............. | F16L 15/008 285/321 |
| 4,648,627 A * | 3/1987 | Reimert | .............. | E21B 17/042 285/91 |
| 4,662,659 A | 5/1987 | Blose et al. | | |
| 4,671,544 A * | 6/1987 | Ortloff | .............. | E21B 17/0423 285/332.2 |
| 6,056,324 A * | 5/2000 | Reimert | .............. | E21B 19/16 29/446 |
| 6,511,102 B2 * | 1/2003 | Krug | .............. | F16L 15/004 285/333 |
| 8,628,121 B1 * | 1/2014 | Clark | .............. | E21B 17/08 285/333 |
| 10,316,995 B2 * | 6/2019 | Gillot | .............. | F16L 15/004 |
| 10,495,241 B2 * | 12/2019 | Inose | .............. | F16L 15/06 |
| 11,174,686 B2 * | 11/2021 | Mutis Rueda | .............. | F16L 15/002 |
| 11,300,233 B2 * | 4/2022 | Inose | .............. | F16L 15/04 |
| 11,493,154 B2 * | 11/2022 | Daly | .............. | F16L 15/002 |
| 2004/0017081 A1 | 1/2004 | Simpson et al. | | |
| 2004/0251686 A1 | 12/2004 | Otten et al. | | |
| 2010/0123311 A1 * | 5/2010 | Church | .............. | F16L 15/001 403/334 |
| 2012/0175846 A1 * | 7/2012 | Hedrick | .............. | F16L 15/001 277/336 |
| 2019/0330930 A1 | 10/2019 | Oku et al. | | |
| 2021/0247004 A1 * | 8/2021 | Briane | .............. | F16L 15/002 |
| 2021/0301600 A1 * | 9/2021 | Michiwaki | .............. | E21B 17/0426 |
| 2021/0317856 A1 | 10/2021 | Harvey et al. | | |
| 2023/0250699 A1 * | 8/2023 | Rekin | .............. | E21B 17/02 175/325.2 |

FOREIGN PATENT DOCUMENTS

| | | | |
|---|---|---|---|
| GB | 392827 A | * | 5/1933 |
| WO | 2008116891 A1 | | 10/2008 |
| WO | 2015099757 A1 | | 7/2015 |

* cited by examiner

HIGH TORQUE THREADED CONNECTIONS WITH EXTERNAL UPSET AND MULTIPLE SEALS

FIELD OF THE DISCLOSURE

The present disclosure relates generally to threaded pipes and, more particularly, to threaded connections between tubular members and including a thread profile defining at least two tapered sections and an intermediate shoulder provided at a transition between the tapered sections.

BACKGROUND OF THE DISCLOSURE

In the oil and gas industry, several types of tubing and pipe are used in exploration, completion, and production operations to extract hydrocarbons from subterranean hydrocarbon-bearing formations. Typical types of oilfield tubing include, among others, drill pipe, casing (or liner), and production tubing. Connected sections (lengths) of casing or liner pipe, for example, are used to encase the walls of a drilled wellbore and provide structural support for the well, and connected sections (lengths) of production pipe are used to convey the subsurface oil or gas to the well surface.

Wellbore pipe typically has a threaded end configuration specially designed to meet its intended purpose as it structurally secures and seals the pipe ends together. Common threaded connections include a male threaded member or "pin" at the end of a tubing section, which engages a female threaded member or "box" at the end of an adjoining tubing section. The box may be formed as an integral part of the tubing section or it may comprise a coupling secured to a pin end of a tubular pipe section.

Threaded connections of oilfield pipe and tubulars generally engage each other in an interference fit, a shouldering fit, or a combination of interference and shouldering fits. In an interference fit, tapered pin and box ends are tightly wedged together as the pin threadably advances into the box. The resulting interference fit provides both structural and sealing connections between the pin and box ends. In contrast, a shouldering connection engages an annular shoulder on the pin end with an annular shoulder provided on the box end. The threads of the shouldering connection provide the structure holding the pin and box ends together, and the engaged shoulders help facilitate a sealed engagement.

Threaded connections tend to fail in areas of stress concentrations that occur during makeup and working of the connections. In particular, threaded connections can often exceed compression limits during deployment and production. A variety of thread designs, forms, and profiles have been suggested and introduced to change the distribution of torque stresses along the threaded connections of oilfield tubing, and thereby improve the long-term pipe integrity.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment, a threaded connection may include a first tubular member having a box end defining an internal thread profile, and a second tubular member having a pin end defining an external thread profile threadably engageable with the internal thread profile of the box end, wherein the external thread profile includes a first section that extends at a first taper angle relative to a longitudinal axis of the threaded connection, a second section extending from the first section at a second taper angle relative to the longitudinal axis, and an intermediate shoulder provided at a transition between the first and second sections and engageable with a corresponding intermediate shoulder provided on the internal thread profile, wherein a cross-sectional area of the pin end increases at the intermediate shoulder.

According to one or more additional embodiments, a thread profile for a tubular member may include a first section that extends from a first end of the thread profile at a first taper angle relative to a longitudinal axis of the tubular member, a second section extending from the first section at a second taper angle relative to the longitudinal axis, wherein the first taper angle is greater than the second taper angle, and an intermediate shoulder provided at a transition between the first and second sections, wherein a cross-sectional area of the tubular member increases at the intermediate shoulder.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Embodiments of the present disclosure will now be described in detail with reference to the accompanying Figures. Wherever possible, like or identical reference numerals are used in the figures to identify common or the same elements. The figures are not necessarily to scale and certain features and certain views of the figures may be shown exaggerated in scale for purposes of clarification. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description.

Embodiments in accordance with the present disclosure generally relate to threaded connections that include a first tubular member having a box end defining an internal thread profile, and a second tubular member having a pin end defining an external thread profile threadably engageable with the internal thread profile of the box end. The external thread profile can include a first section that extends at a first taper angle relative to a longitudinal axis of the threaded connection, a second section extends from the first section at a second taper angle relative to the longitudinal axis, and an intermediate external shoulder may be provided at a transition between the first and second sections and engageable with a corresponding intermediate shoulder provided on the internal thread profile. A cross-sectional area of the pin end increases at the intermediate external shoulder.

Figure 1:
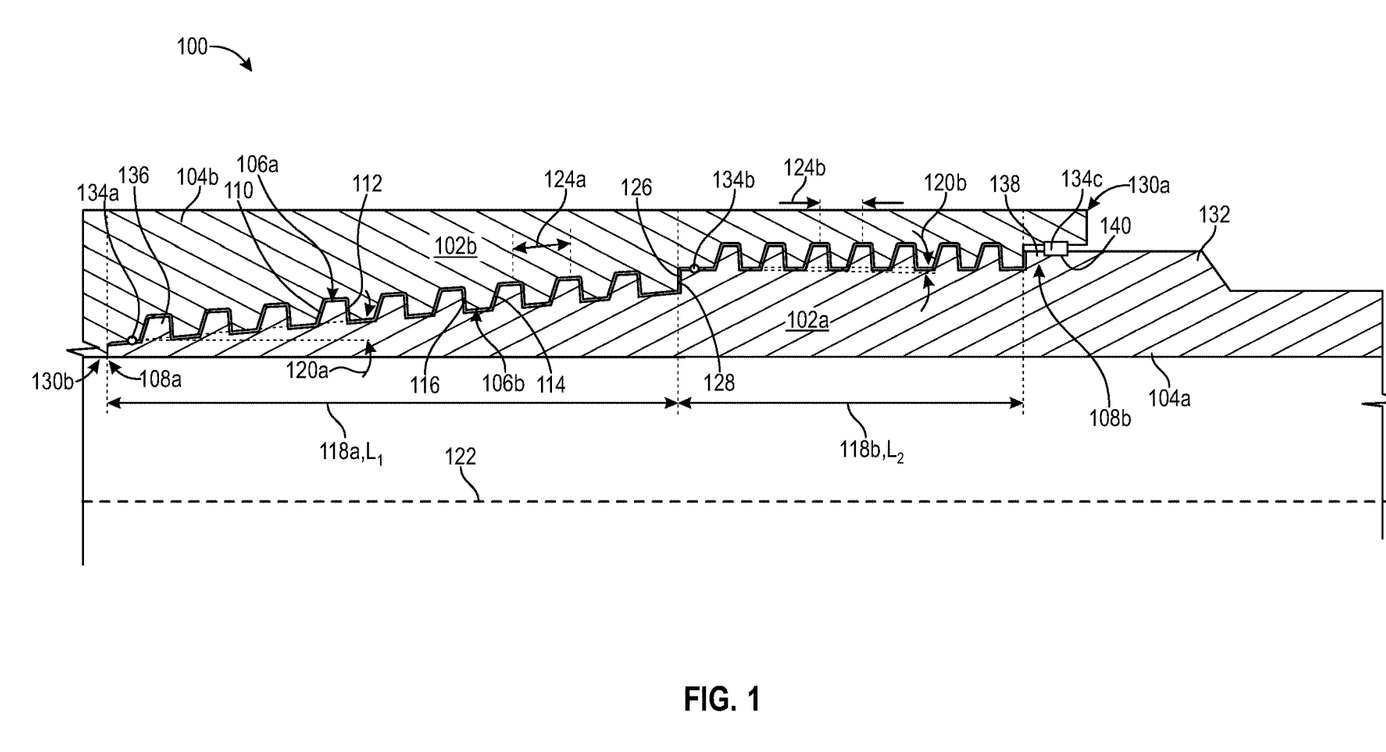
FIG. 1 is a cross-sectional side view of an example threaded connection that may incorporate the principles of the present disclosure.

FIG. 1 is a cross-sectional side view of an example threaded connection 100 that may incorporate the principles of the present disclosure. The threaded connection 100 (also referred to as a "tool joint") may form part of a string of multiple pipes (alternately referred to herein as "tubulars," "tubular members," or "tubes") threadably connected together end-to-end. As illustrated, the threaded connection 100 may include a pin end or "pin" 102a of a first tubular member 104a and a box end or "box" 102b of a second tubular member 104b. The first and second tubular members 104a,b may comprise any type of tubing, pipe, or tubulars commonly used in the oil and gas industry and capable of being threadably connected end-to-end. Examples of the tubular members 104a,b include, but are not limited to, drill pipe, casing (or liner), production tubing, general tubular assemblies (e.g., a wellbore hanger, hydraulic fracturing tools, float equipment, etc.), and any combination thereof. In at least one embodiment, the tubular members 104a,b may exhibit an external diameter of 5.5 inches or less, but could alternatively exhibit a diameter greater than 5.5 inches, without departing from the scope of the disclosure.

During operation, it is desirable that the threaded connection 100 have sufficient strength to withstand all expected service loads (e.g., torsion, tension, compression, etc.). Particularly, it is desirable that the threaded connection 100 have sufficient torsional strength or "torque capacity," which is a measure of the amount of torque applied about the centerline of the threaded connection 100 required to cause failure. In order to optimize the torque capacity of the threaded connection 100, the threads must be designed to have sufficient bearing and shear strength to avoid the common failures resulting from elevated torsion. Bearing strength is a measure of the amount of force required to cause deformation (e.g., plastic deformation) of engaged surfaces (e.g., thread flanks) of the threaded connection 100, and shear strength is a measure of the amount of force required to shear the threads between the thread flanks along a plane substantially parallel to the connection centerline. It is also desirable that the threaded connection 100 provide a gas-tight seal for the conveyance or preservation of gaseous hydrocarbons.

As illustrated, the pin 102a defines or otherwise provides a helically extending external thread profile 106a threadably engageable with a helically extending internal thread profile 106b provided by the box 102b. The external thread profile 106a includes a first or "distal" end 108a at or near the distal end of the pin 102a, and a second or "proximal" end 108b. Each turn or "tooth" of the external thread profile 106a includes a stab flank 110 and a load flank 112, and each turn or "tooth" of the internal thread profile 106b similarly includes a stab flank 114 and a load flank 116. As the threaded connection 100 is made up (e.g., threaded or coupled together), the stab flanks 110, 114 of adjacent teeth oppose each other, and the load flanks 112, 116 of adjacent teeth oppose each other.

As used herein, the term "thread profile" refers to the thread form or configuration of a thread in an axial plane and which is generally considered to include a crest, a root, and opposing stab and load flanks. The term "stab flank" is intended to designate those flanks of the pin and box threads that first engage as the pin 102a is stabbed into the box 102b, and the term "load flank" is intended to designate those contacting flanks of the pin and box threads that normally contact with an increasing bearing pressure in reaction to the load forces tending to separate the engaged pin 102a and box 102b axially.

It is contemplated herein to match the internal thread profile 106b of the box 102b to the external thread profile 106a of the pin 102a such that the threaded connection 100 exhibits optimized torsional strength and a gas-tight seal. Accordingly, while the following discussion corresponds to the external thread profile 106a of the pin 102a, portions of the discussion are equally applicable to the internal thread profile 106b of the box 102b.

In the illustrated embodiment, the external thread profile 106a provides and otherwise defines a first or "nose" section 118a extending from the distal end 108a, and a second or "stress bearing" section 118b extending from the nose section 118a to the proximal end 108b. The nose and stress bearing sections 118a,b collectively form the thread profile 106a and extend contiguously in succession along the axial length of the thread profile 106a. As described herein, the various differences in the nose and stress bearing sections 118a,b may prove advantageous in easing the process of stabbing the pin 102a into the box 102b, as well as resulting in improved rotational capacity and compression ratings.

The nose section 118a extends or otherwise exhibits a first length $L_1$, and the stress bearing section 118b exhibits a second length $L_2$ extending from the nose section 118a. In some embodiments, the first and second lengths $L_1$, $L_2$ may be the same; e.g., $L_1=L_2$. In other embodiments, however, the first and second lengths $L_1$, $L_2$ may be different. In the illustrated example, for instance, the first length $L_1$ is greater than the second length $L_2$; e.g., $L_1>L_2$. In other embodiments, however, the second length $L_2$ may be greater than the first length $L_1$ without departing from the scope of the disclosure. Those skilled in the art will readily appreciate that the magnitude of each length $L_1$, $L_2$ may be modified to meet specifications of particular applications.

The nose section 118a extends at a first taper angle 120a relative to a longitudinal axis 122 of the threaded connection 100, and the stress bearing section 118b extends at a second taper angle 120b relative to the longitudinal axis 122. In some embodiments, the taper angles 120a,b may be the same; e.g., 120a=120b. In such embodiments, the cross-sectional area of the pin 102a will progressively increase at a constant rate between the distal and proximal ends 108a,b of the external thread profile 106a. In other embodiments, however, the taper angles 120a,b may be different. In the illustrated example, for instance, the first taper angle 120a is greater than the second taper angle 120b; e.g., 120a>120b. Having the first taper angle 120a greater than the second taper angle 120b may help ease the stab-in process for the threaded connection 100. More particularly, a steeper first taper angle 120a may facilitate better and deep stabbing, especially in applications that do not include a stab-in guide.

The thread profile 106a across each section 118a,b may provide the same or different thread pitches, where "thread pitch" is defined as the distance between corresponding points on axially adjacent threads of the thread profile 106a. More specifically, the nose section 118a provides a first thread pitch 124a, and the stress bearing section 118b provides a second thread pitch 124b. In some embodiments, the thread pitches 124a,b may be the same, but could alternatively be different. Accordingly, the thread profile 106a may exhibit single or double thread pitches 124a,b. In the illustrated example, the first thread pitch 124a is greater than the second thread pitch 124b; e.g., 124a>124b, which results in the nose section 118a being more coarse as compared to the stress bearing section 118b. This may prove advantageous in reducing the risk of cross-threading with the box 102b during the connection make-up process. This may also provide enhanced torque capacity due to the increased cross-sectional area of the stress bearing section 118b, and the increased torsional strength of the threaded connection 100 ensures improved performance during deployment in challenging well conditions, such as deep wells, horizontal wells, long reach wells, etc.

In some embodiments, the external thread profile 106a may provide and otherwise define an intermediate shoulder 126 located at a transition between the nose and stress bearing sections 118a,b. The cross-sectional area of the pin 102a increases at the intermediate shoulder 126, which may help improve the torsional performance of the threaded connection 100. The internal thread profile 106b may provide or define a corresponding intermediate shoulder 128 configured to engage the intermediate shoulder 126 of the external thread profile 106a. The double-taper thread with the intermediate shoulder 126 helps to ensure a deep stab-in with reduced risk of cross-threading.

As indicated above, portions of the foregoing discussion related to the external thread profile 106a of the pin 102a are equally applicable to the internal thread profile 106b of the box 102b. Consequently, the internal thread profile 106b may also include a double tapered profile that matches the double tapered external thread profile 106a. More specifically, the internal thread profile 106b may include a first or "distal" end 130a, a second or "proximal" end 130b opposite the distal end 130a, a first section (not labeled) that exhibits a first taper (or taper angle), and a second section (not labeled) that exhibits a second taper (or taper angle). The pitch(es) 124a,b used on the pin 102a may generally match corresponding pitch(es) of the box 102b across the corresponding sections of the profiles 106a,b.

In some embodiments, as illustrated, the pin 102a of the threaded connection 100 may further include an external upset 132 located proximal from the proximal end 108b of the external thread profile 106a. The external upset 132 increases the cross-sectional area of the threaded connection 100 as compared to the remaining portions of the first tubular 104a, which helps improve the torsional capacity and ensures the tensile capacity of the threaded connection 100 exceeds the tensile capacity of the body of the first tubular 104a. The upset 132 may also help to provide sufficient material to develop the double-taper structure described herein.

The threaded connection 100 may also include one or more seals formed or otherwise provided between the opposing external and internal thread profiles 106a,b, and such seals facilitate gas-tight sealing points along the threaded connection 100. In some embodiments, as illustrated, the threaded connection 100 may include a first or "primary" seal 134a arranged at or near the distal end 108a of the external thread profile 106a (i.e., also near the proximal end 130b of the internal thread profile 106b). In at least one embodiment, the primary seal 134a may be positioned axially between the distal end of the pin 102a (or the proximal end of the box 102b) and an initial engaged thread 136 of the external thread profile 106a.

In some embodiments, the primary seal 134a may comprise a metal-to-metal seal generated by the opposing engagement of the external and internal thread profiles 106a,b. In such embodiments, for example, the primary seal 134a may be formed between opposing tapered (but flat) surfaces of the external and internal thread profiles 106a,b. In other embodiments, however, the primary seal 134a may be formed between a tapered (but flat) surface of one of the external and internal thread profiles 106a,b and an opposing spherical (or bulbous) projection provided by the other of external and internal thread profiles 106a,b. In yet other embodiments, the primary seal 134a may be formed between opposing spherical (or bulbous) projections provided by both the external and internal thread profiles 106a,b.

In some embodiments, the threaded connection 100 may further include a second or "secondary" seal 134b arranged at the interface between the intermediate shoulders 126, 128 and otherwise at the transition between the nose and stress bearing sections 118a,b. The secondary seal 134b may operate as a backup or redundant seal to the primary seal 134a, which may prove advantageous in the event the primary seal 134a is damaged during the stabbing or make-up process of the threaded connection 100. Similar to the primary seal 134a, in some embodiments, the secondary seal 134b may also comprise a metal-to-metal seal generated by the opposing engagement of the external and internal thread profiles 106a,b. In such embodiments, for example, the secondary seal 134b may be formed between opposing tapered (but flat) surfaces of the external and internal thread profiles 106a,b at the intermediate shoulder 126. In other embodiments, however, the secondary seal 134b may be formed between a tapered (but flat) surface of one of the external and internal thread profiles 106a,b and an opposing spherical (or bulbous) projection provided by the other of external and internal thread profiles 106a,b. In yet other embodiments, the secondary seal 134b may be formed between opposing spherical (or bulbous) projections provided by both the external and internal thread profiles 106a,b.

In some embodiments, the threaded connection 100 may further include a tertiary seal 134c that operates as an external seal or another metal-to-metal seal that functions as an external seal. In the illustrated embodiment, the tertiary seal 134c may be arranged between the external and internal thread profiles 106a,b at or near the proximal end 108b of the external threaded profile 106a (or the distal end 130a of the internal threaded profile 106b). For example, the tertiary seal 134c may be positioned at the stress contact area at or near the last engaged thread 138 of the threaded connection 100.

In at least one embodiment, the tertiary seal 134c may include or otherwise comprise a resilient seal, such as a seal ring, positioned within a groove 140 defined in the threaded connection 100. In such embodiments, the tertiary seal 134c may be made of a variety of pliable materials including, but not limited to, a polymer and an elastomer. In some embodiments, the tertiary seal 134c may be made of a material that is water swellable, but may alternatively be made of a non-water swellable seal material, depending on the application.

The groove 140 that receives the tertiary seal 134c may be defined in one or both of the pin 102a and the box 102b. The groove 140 may exhibit sufficient tolerances to generate an interference fit with or without the volumetric strain of the tertiary seal 134c, where applicable. The specific dimensions of the groove 140 may be dependent on the size of the tubular(s) 104a,b. In some embodiments, the cross-sectional shape of the groove 140 may be rectangular. In such embodiments, the base dimension of the groove 140 may match or may be slightly smaller than the cross-sectional size of the tertiary seal 134c to help facilitate an interference fit within the groove 140. Moreover, in such embodiments, the top dimension (e.g., opening) of the groove 140 may be smaller than the base dimension, which may prove advantageous in helping retain the tertiary seal 134c in the groove 140. In other embodiments, however, the cross-sectional shape of the groove 140 may include other shapes besides rectangular, such as, but not limited to, rounded or oval, without departing from the scope of the disclosure.

Figure 2:
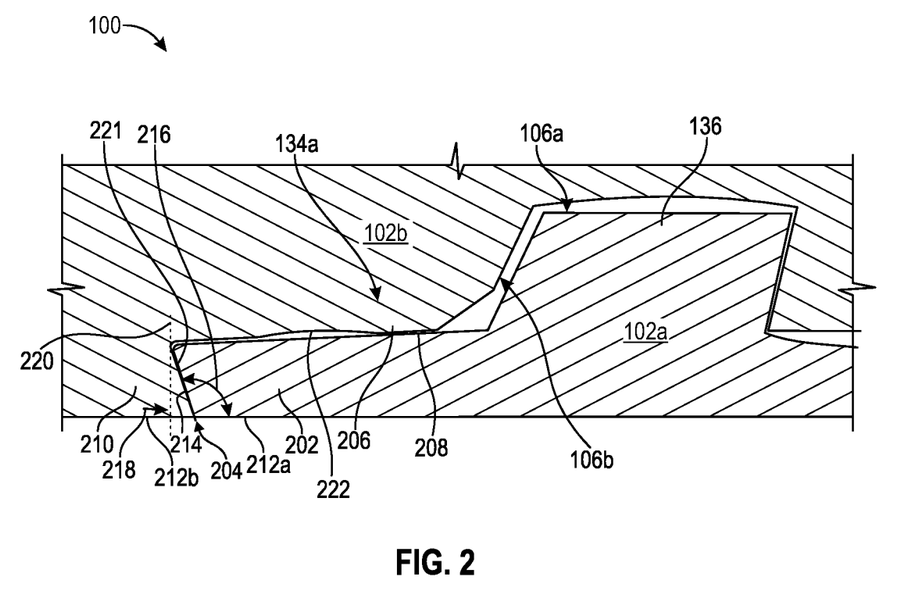
FIG. 2 is an enlarged cross-sectional view of a portion of the threaded connection of FIG. 1, according to one or more embodiments.

FIG. 2 is an enlarged cross-sectional view of a portion of the threaded connection 100, according to one or more embodiments. As illustrated, the pin 102a provides an extended lip 202 that terminates in a distal end 204, which forms the distal end of the pin 102a. In some embodiments, the primary seal 134a may be positioned on or along the extended lip 202 and otherwise arranged at or near the distal end 204 of the pin 102a. In such embodiments, the primary seal 134a may be positioned between the distal end 204 and the initial engaged thread or "tooth" 136 of the external thread profile 106a.

As mentioned above, the primary seal 134a may comprise a metal-to-metal seal generated by the opposing engagement of the external and internal thread profiles 106a,b. In the illustrated embodiment, the primary seal 134a includes a spherical (or bulbous) projection 206 defined by the internal thread profile 106b of the box 102b and is engageable with an opposing tapered (but flat) surface 208 of the external thread profile 106a of the pin 102a. In other embodiments, however, the projection 206 may alternatively be defined by the external thread profile 106a and the opposing tapered (but flat) surface 208 may be provided by the internal thread profile 106b. In yet other embodiments, each of the external and internal thread profiles 106a,b may define or provide complimentary opposing spherical (or bulbous) projections 206 engageable with each other to form the primary seal 134a, without departing from the scope of the disclosure.

The distal end 204 may be configured to axially engage a load shoulder 210 of the opposing box 102b and thereby provide a metal-to-metal seal at the interface between the distal end 204 and the load shoulder 210. The extended lip 202 of the pin 102a may define an inner surface 212a, and the load shoulder 210 of the box 102b may also define an inner surface 212b. In some embodiments, as illustrated, the inner surfaces 212a,b may align, thus providing a flush inner diameter of the threaded connection 100 at the interface between the distal end 204 and the load shoulder 210. The flush inner diameter across the interface between the inner surfaces 212a,b may prove advantageous in reducing the risk of erosion and abrasion within the threaded connection 100 at that location.

In some embodiments, the distal end 204 may provide and otherwise define a reverse angle portion or surface 214 that extends from the inner surface 212a of the pin 102a at an angle 216. In some embodiments, the angle 216 may be about 105° from the inner surface 212a. Stated differently, the reverse angle surface 214 may extend at a reverse angle 218 of about 15°, where the reverse angle 218 is measured from a line 220 perpendicular to the inner surface 212a. The reverse angle surface 214 helps provide a positive contact with the opposing load shoulder 210 of the box 102b, which provides a correspondingly angled surface 221, which helps improve compression efficiency and sealing capabilities.

In some embodiments, the threaded connection 100 may further provide or otherwise define a pocket 222 at the interface between the external and internal thread profiles 106a,b and located along the extended lip 202. In the illustrated embodiment, for example, the pocket 222 is located axially between the primary seal 134a and the distal end 204 of the pin 102a. The pocket 222 may provide a location to accommodate excess thread dope (e.g., lubricant), which is commonly used to help ease the make-up process of the threaded connection 100. In the illustrated embodiment, the pocket 222 comprises a concave section defined in the internal thread profile 106b and opposing the tapered (but flat) surface 208 of the external thread profile 106a. In other embodiments, however, the pocket 222 may alternatively be defined in the external thread profile 106a, or the pocket 222 could be defined jointly by the external and internal thread profiles 106a,b, without departing from the scope of the disclosure.

Figure 3:
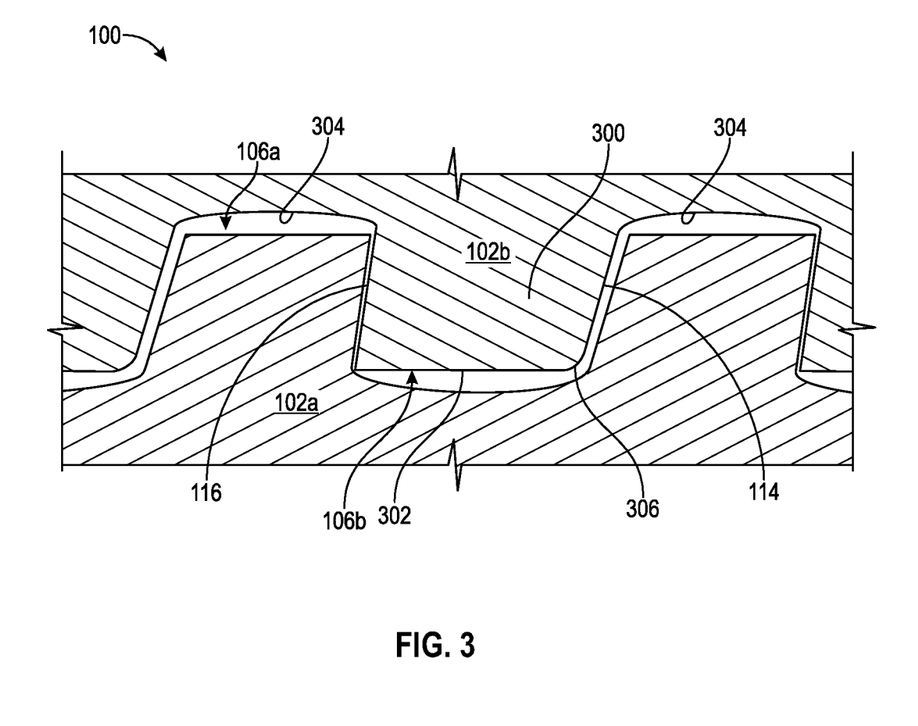
FIG. 3 is another enlarged cross-sectional view of a portion of the threaded connection of FIG. 1, according to one or more additional embodiments.

FIG. 3 is another enlarged cross-sectional view of a portion of the threaded connection 100 of FIG. 1, according to one or more embodiments. As illustrated, the internal thread profile 106b of the box 102b provides a thread or "tooth" 300 that defines a crest 302 and roots 304, and the stab and load flanks 114, 116 extend between the crest 302 and the corresponding root 304. The stab flank 114 may transition to the crest 302 at a transition surface 306.

In some embodiments, as illustrated, the stab flank 114 and the crest 302 may each be substantially flat surfaces, and the transition surface 306 may comprise an arcuate or curved surface extending from the crest 302 to the stab flank 114. In at least one embodiment, the radius of the transition surface 306 may be about 30°, but could be more or less than 30°, without departing from the scope of the disclosure. The transition surface 306 may prove advantageous in providing an anti-galling characteristic and otherwise mitigating galling between the thread profiles 106a,b and, more particularly, between the crest 302 of one profile 106a,b and the roots 304 of the other profile 106a,b during the connection make-up process.

Figure 4:
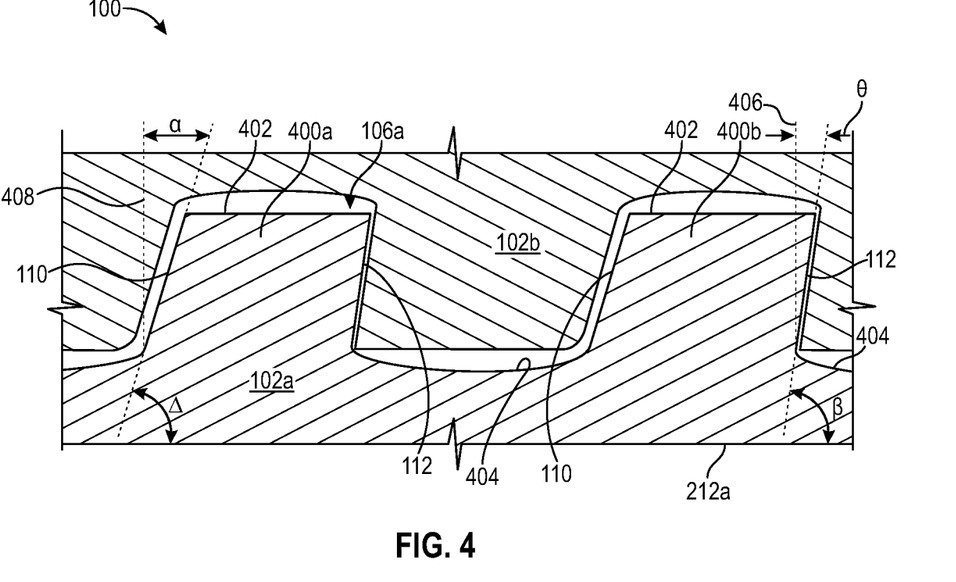
FIG. 4 is another enlarged cross-sectional view of a portion of the threaded connection of FIG. 1, according to one or more additional embodiments.

FIG. 4 is another enlarged cross-sectional view of a portion of the threaded connection 100 of FIG. 1, according to one or more additional embodiments. As illustrated, the external thread profile 106a of the pin 102a provides first and second threads or "teeth" 400a and 400b sequentially aligned along the external thread profile 106a. Each tooth 400a,b defines a crest 402 and a root 404, and the stab and load flanks 110, 112 extend between the crest 302 and the corresponding root 404.

In some embodiments, the geometry of the teeth 400a,b, and therefore the overall geometry of the external thread profile 106a, may be modified to reduce the risk of thread "jump out" under increased tensile load or excessive torque during the connection make-up process. Thread jump-out is a connection failure mode resulting from the formation of a gap between opposing thread flanks, and can promote the total separation of the tubular string. It can occur as a result of excessive torque during make-up or improper make-up, and the risk of thread jump-out increases with increasing tension. In the illustrated embodiment, the load flank 112 of one or both of the teeth 400a,b may extend at an angle β from the inner surface 212a of the pin 102a (or the longitudinal axis 122 of FIG. 1), where the angle β is about 85°.

Expressed differently, the load flank 112 may extend at an angle θ as measured relative to a line 406 perpendicular to the inner surface 212a (or the longitudinal axis 122), and the angle θ may be about −5°, and ranging between about −4.5° and about −5.5°. Accordingly, the load flank 112 may be described as extending at a "negative load angle," and having the load flank 112 extend at the negative load angle may help improve tensile capacity, and reduce relative sliding and radial separation between the pin 102a and the box 102b, which minimizes the risk of thread jump-out.

In other embodiments, or in addition thereto, the stab flank 110 of one or both of the teeth 400a,b may extend at an angle Δ from the inner surface 212a of the pin 102a (or the longitudinal axis 122 of FIG. 1), where the angle Δ is about 80°. Expressed differently, the stab flank 110 may extend at an angle α measured relative to a line 408 perpendicular to the inner surface 212a (or the longitudinal axis 122), and the angle α may be about −10°. Providing the stab flank 110 at angle Δ or α may help improve the efficiency of the connection make-up process.

Figure 5:
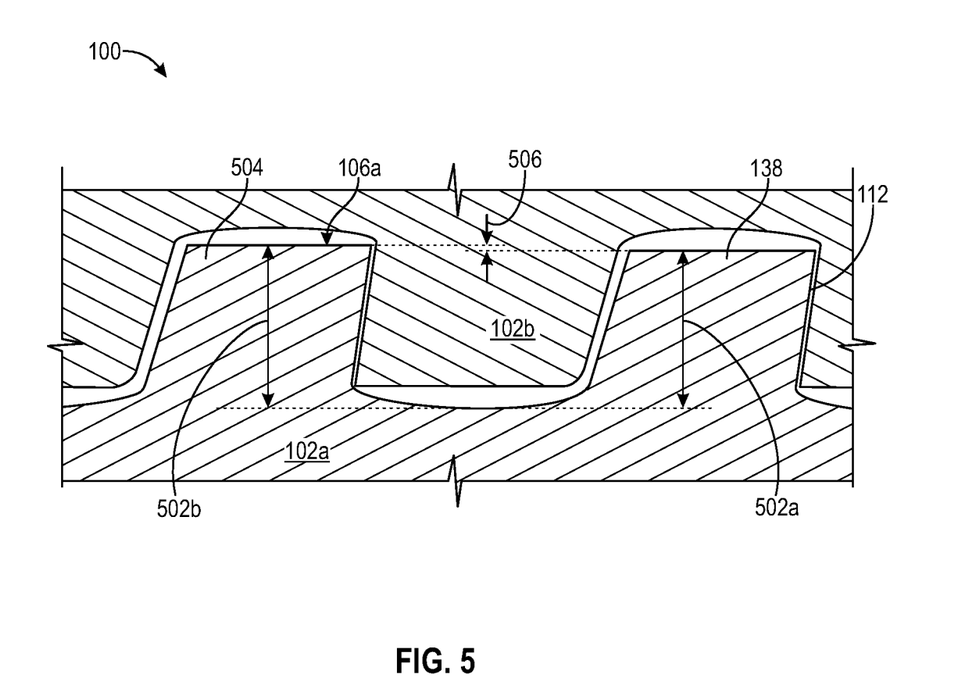
FIG. 5 is another enlarged cross-sectional view of a portion of the threaded connection of FIG. 1, according to one or more additional embodiments.

FIG. 5 is another enlarged cross-sectional view of a portion of the threaded connection 100 of FIG. 1, according to one or more additional embodiments. The turns or "teeth" in the external thread profile 106a may exhibit the same or different thread height, where "thread height" is defined as the distance between the crest and the root of a given thread or "tooth". In one or more embodiments, the last engaged thread or "tooth" 138 of the external thread profile 106a may exhibit a first thread height 502a and one or more of the remaining teeth 504 of the external thread profile 106a may exhibit a second thread height 502b different from the first thread height 502a. In at least one embodiment, for example, the first thread height 502a may be less than the second thread height 502b such that there is a height difference 506 between the thread heights 502a,b.

The last engaged thread or tooth 138 is often an incomplete thread, and providing the last engaged tooth 138 with a decreased (lesser) thread height 502a as compared to the remaining teeth 504 may prove advantageous in reducing the risk of plastic deformation at the load flank 112 and ultimately thread jump out. Those skilled in the art will readily appreciate that deformation can be more severe at the last engaged tooth 138 mainly due to the increased height of the incomplete thread of the pin connection. Moreover, the risk of deformation can be higher in applications where the load flank 112 extends at a negative load angle (as provided in FIG. 5), which can result in loss of reusability as well as an increase in the risk of galling, especially when the tubular is used as a work string or a landing string.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, as used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The invention claimed is:

1. A threaded connection, comprising:
a first tubular member having a box end, the first tubular member having an internal surface defining an internal thread profile at the box end; and
a second tubular member having a pin end defining an external thread profile threadably engageable with the internal thread profile,
wherein the external thread profile includes:
a first section that extends at a first taper angle relative to a longitudinal axis of the threaded connection;
a second section extending from the first section at a second taper angle relative to the longitudinal axis;
an intermediate shoulder provided at a transition between the first and second sections and engageable with a corresponding intermediate shoulder provided on the internal thread profile;
an external upset defined on the pin end proximal to a proximal end of the external thread profile, wherein the external upset has a groove, wherein the external upset increases a cross-sectional area of the second tubular member as compared to remaining portions of the second tubular member, wherein a distal end of the first tubular member extends over at least a portion of the external upset such that a gap separates the external upset from the internal surface of the first tubular member, wherein a maximum outer diameter of the external upset is less than a maximum outer diameter of the first section, and wherein the maximum outer diameter of the external upset is greater than a maximum outer diameter of the second section;
a first seal provided at or near a distal end of the external thread profile and facilitating a sealed interface between the external and internal thread profiles, the first seal comprising a bulbous projection defined on at least one of the external and internal thread profiles; and
a second seal disposed in the groove of the external upset and disposed in the gap, wherein the second seal is engaged with the external upset and the internal surface of the first tubular member,
wherein a cross-sectional area of the pin end increases at the intermediate shoulder.

2. The threaded connection of claim 1, wherein the first taper angle is greater than the second taper angle.

3. The threaded connection of claim 1, wherein the first section provides a first thread pitch and the second section provides a second thread pitch less than the first thread pitch.

4. The threaded connection of claim 1, further comprising a pocket provided at an interface between the external and internal thread profiles and located axially between the first seal and the distal end.

5. The threaded connection of claim 1, further comprising a third seal provided at an interface between the intermediate shoulder and the corresponding intermediate shoulder of the internal thread profile.

6. The threaded connection of claim 5, wherein the third seal comprises a bulbous projection defined on at least one of the external and internal thread profiles.

7. The threaded connection of claim 1, wherein the pin end includes an extended lip that extends past the external thread profile and terminates in a distal end of the second tubular member, and wherein the distal end of the second tubular member provides a reverse angle surface engageable with a load shoulder of the box end.

8. The threaded connection of claim 1, wherein the internal thread profile provides a tooth that defines a crest, a root, and a stab flank that extends between the crest and the root, and wherein a curved transition surface extends between the stab flank and the crest and exhibits a radius of about 30°.

9. The threaded connection of claim 1, wherein the external thread profile provides a tooth that defines a crest, a root, and a load flank that extends between the crest and the root at a negative load angle of about −5° measured relative to a line perpendicular to the internal surface of the second tubular member.

10. The threaded connection of claim 1, wherein the external thread profile provides a last engaged tooth that exhibits a first thread height, and wherein adjacent teeth of the external thread profile exhibit a second thread height greater than the first thread height.

11. The threaded connection of claim 1, wherein the first and second sections extend contiguously in succession along an axial length of the external thread profile and interposed only by the intermediate shoulder.

12. The threaded connection of claim 1, wherein a last engaged tooth of the second section exhibits a thread height that is less than a thread height of remaining teeth of the second section.

13. The threaded connection of claim 1, wherein:
the internal surface of the first tubular member includes a first portion and a second portion, wherein the first portion includes the internal thread profile and the second portion defines a first bore having a first inner diameter; and
the second tubular member includes an external surface and an internal surface opposite of the external surface of the second tubular member, the internal surface of the second tubular member defining a second bore having a second inner diameter that is the same as the first inner diameter, wherein the second bore has a first bore portion opposite the bulbous projection and a second bore portion opposite the first and second sections that both have the second inner diameter, and wherein the second portion of the internal surface of the first tubular member is flush with the internal surface of the second tubular member when the external thread profile is threadably engaged with the internal thread profile.

14. A thread profile for a tubular member, comprising:
a first section including first threads that extends from a first end of the thread profile at a first taper angle relative to a longitudinal axis of the tubular member, wherein the first end includes an end surface;
a second section including second threads that extends from the first section at a second taper angle relative to the longitudinal axis, wherein the first taper angle is greater than the second taper angle;
an intermediate shoulder provided at a transition between the first and second sections, wherein a cross-sectional area of the tubular member increases at the intermediate shoulder;
an external upset extending proximally from the second section, wherein the external upset increases a cross-sectional area of the thread profile as compared to remaining portions of the tubular member; and
a bulbous projection located between the end surface and the first threads,
wherein a maximum outer diameter of the external upset is less than a maximum outer diameter of the second section and greater than an outer maximum diameter of the first section.

15. The thread profile of claim 14, wherein a last tooth of the second section exhibits a thread height that is less than a thread height of remaining teeth of the second section.

16. The thread profile of claim 14, wherein the thread profile is formed on the external surface of a pin end of the tubular member, wherein the tubular member has an internal surface opposite the external surface that defines a bore of the tubular member, wherein a first portion of the bore opposite the bulbous projection has the same inner diameter as a second portion of the bore opposite the first and second sections.

17. A tubular connection, comprising:
a first tubular member including an internal surface defining an internal thread profile at a box end of the first tubular member and a bore of the first tubular member, wherein the internal surface includes a first angled end surface at the transition between the internal thread profile and the bore of the first tubular member; and
a second tubular member including an exterior surface defining an external thread profile on a pin end of the second tubular that is threadably engageable with the internal thread profile, an internal surface opposite of the exterior surface of the second tubular member defining a bore of the second tubular member, and a second angled end surface at a distal end of pin engageable with the first angled end surface, wherein the external thread profile includes:
a first threaded section that extends at a first taper angle relative to a longitudinal axis of the threaded connection;
a second threaded section extending from the first threaded section at a second taper angle relative to the longitudinal axis;
an intermediate shoulder provided at a transition between the first and second threaded sections and engageable with a corresponding intermediate shoulder provided on the internal thread profile; and
a lip extending between the second threaded section and the second angled end surface, the lip including a bulbous projection configured to seal against the internal thread profile, wherein a first portion of the bore of the second tubular member that is opposite the bulbous projection has the same inner diameter as a second portion of the bore of the second tubular member that is opposite the first and second threaded sections, and wherein the internal surface of the first tubular member is flush with the internal surface of the second tubular member when the external thread profile is threadably engaged with the internal thread profile; and an external upset on the second tubular member, wherein the external thread profile is disposed between the external upset and the second angled end surface at the distal end of the pin, wherein a maximum outer diameter of the external upset is less than a maximum outer diameter of the first threaded section, and wherein the maximum outer diameter of the external upset is greater than a maximum outer diameter of the second threaded section.

18. The tubular connection of claim 17, wherein the external upset interposes the external thread profile and a first tubular portion that extends between the pin end and another end of the second tubular, wherein the maximum outer diameter of the external upset is greater than an outer diameter of the first tubular portion of the second tubular member, and wherein the internal surface of the first tubular member overlaps a portion of the external upset such that a gap separates the external upset from the internal surface of the first tubular member; and a seal disposed in a groove formed in the external upset, the seal extending across the gap being engaged with the external upset and the box end.

19. The tubular connection of claim 17, wherein the first angled surface extends at a first angle relative to the internal surface of the first tubular member, wherein the second angled surface extends at a second angle relative to the internal surface of the second tubular member, and wherein a sum of the first and second angles is 180 degrees.

* * * * *